United States Patent
Grajek et al.

(10) Patent No.: US 10,680,823 B2
(45) Date of Patent: Jun. 9, 2020

(54) PASSWORD-LESS SOFTWARE SYSTEM USER AUTHENTICATION

(71) Applicant: Cylance Inc., Irvine, CA (US)

(72) Inventors: Garret Florian Grajek, Aliso Viejo, CA (US); Jeffrey Lo, Irvine, CA (US); Homer Valentine Strong, Irvine, CA (US); Wulun Dai, Lake Forest, CA (US)

(73) Assignee: Cylance Inc., Irvine, CA (US)

( * ) Notice: Subject to any disclaimer, the term of this patent is extended or adjusted under 35 U.S.C. 154(b) by 207 days.

(21) Appl. No.: 15/808,533

(22) Filed: Nov. 9, 2017

(65) Prior Publication Data

US 2019/0140833 A1   May 9, 2019

(51) Int. Cl.
| | | |
|---|---|---|
| G06F 21/00 | (2013.01) | |
| H04L 9/32 | (2006.01) | |
| G06N 5/02 | (2006.01) | |
| G06F 21/40 | (2013.01) | |
| G06K 9/62 | (2006.01) | |
| G06F 21/32 | (2013.01) | |
| H04L 29/06 | (2006.01) | |
| G06F 21/36 | (2013.01) | |
| H04W 12/00 | (2009.01) | |

(52) U.S. Cl.
CPC ............ *H04L 9/3231* (2013.01); *G06F 21/32* (2013.01); *G06F 21/40* (2013.01); *G06K 9/6278* (2013.01); *G06N 5/022* (2013.01); *H04L 63/0815* (2013.01); *H04L 63/0861* (2013.01); *G06F 21/36* (2013.01); *H04L 63/083* (2013.01); *H04L 2463/062* (2013.01); *H04W 12/00508* (2019.01)

(58) Field of Classification Search
CPC ... H04L 9/3231; H04L 63/0861; G06F 21/32; G06F 21/36; H04W 12/00508; G06K 9/6278
See application file for complete search history.

(56) References Cited

U.S. PATENT DOCUMENTS

| | | | |
|---|---|---|---|
| 9,165,159 B1 * | 10/2015 | McDonnell | G06F 21/6218 |
| 9,355,236 B1 * | 5/2016 | Kratz | G06F 21/32 |
| 9,619,633 B1 * | 4/2017 | Mortensen | G06F 21/32 |
| 2007/0011466 A1 * | 1/2007 | Imura | G07C 9/00142 |
| | | | 713/186 |
| 2007/0150745 A1 * | 6/2007 | Peirce | G06F 21/32 |
| | | | 713/186 |
| 2010/0162386 A1 * | 6/2010 | Li | G06F 21/32 |
| | | | 726/19 |

(Continued)

*Primary Examiner* — Trong H Nguyen
(74) *Attorney, Agent, or Firm* — Jones Day

(57) ABSTRACT

Data is received as part of an authentication procedure to identify a user. Such data characterizes a user-generated biometric sequence that is generated by the user interacting with at least one input device according to a desired biometric sequence. Thereafter, using the received data and at least one machine learning model trained using empirically derived historical data generated by a plurality of user-generated biometric sequences (e.g., historical user-generated biometric sequences according to the desired biometric sequence, etc.), the user is authenticated if an output of the at least one machine learning model is above a threshold. Data can be provided that characterizes the authenticating. Related apparatus, systems, techniques and articles are also described.

20 Claims, 7 Drawing Sheets

(56) References Cited

U.S. PATENT DOCUMENTS

| | | | | |
|---|---|---|---|---|
| 2014/0101752 A1* | 4/2014 | Hrybyk | ................... | G06F 21/31 |
| | | | | 726/17 |
| 2014/0223549 A1* | 8/2014 | Quintanilla | ............ | G06F 21/31 |
| | | | | 726/19 |
| 2014/0310805 A1* | 10/2014 | Kandekar | ............... | G06F 21/36 |
| | | | | 726/19 |
| 2015/0213244 A1* | 7/2015 | Lymberopoulos | ...... | G06F 21/32 |
| | | | | 726/18 |
| 2015/0372810 A1* | 12/2015 | Miller | ................... | H04L 9/0822 |
| | | | | 713/183 |
| 2016/0246472 A1* | 8/2016 | Zhao | ..................... | G06F 1/1694 |
| 2016/0364600 A1* | 12/2016 | Shah | ..................... | G06F 21/629 |

* cited by examiner

PASSWORD-LESS SOFTWARE SYSTEM USER AUTHENTICATION

TECHNICAL FIELD

The subject matter described herein relates to the authentication of users to software systems using password-less techniques including biometric-based authentication.

BACKGROUND

In order to access an information technology (IT) resource (e.g., software application(s), data, and/or the like), users are often required to authenticate themselves to the system providing the IT resource. For example, if a user wishes to access their personal checking account through an online banking application, the user may be required to enter a username, a password, etc. and/or to provide an additional authentication code (e.g., a temporary code which the bank provides to a known device associated with the user). Although these authentication measures generally increase security and reduce the potential that a user's personal information may be compromised, work-a-rounds to these measures are often discovered and exploited.

SUMMARY

Data is received as part of an authentication procedure to identify a user. Such data characterizes a user-generated biometric sequence that is generated by the user interacting with at least one input device according to a desired biometric sequence. Thereafter, using the received data and at least one machine learning model trained using empirically derived historical data generated by a plurality of user-generated biometric sequences (e.g., historical user-generated biometric sequences according to the desired biometric sequence, etc.), the user is authenticated if an output of the at least one machine learning model is above a threshold. Data can be provided that characterizes the authenticating.

The desired biometric sequence can be pre-defined, or alternatively, it can be dynamically selected or generated. For example, the desired biometric sequence can be dynamically generated using at least one biometric sequence generation machine learning model.

Training data can be used as part of a training process prior to the authentication procedure. Such training data can form at least a part of the empirically derived historical data. The training of the at least one machine learning model can be static or it can be ongoing (i.e., the at least one machine learning model can be adaptive and continually refining itself, etc.).

The authenticating can include initially determining whether the user correctly completed the biometric sequence.

The at least one machine learning model can include a model utilizing at least one of: supervised learning, unsupervised learning, semi-supervised learning, or reinforcement learning. For example, the at least one machine learning model can utilize one or more of: random forests, nearest neighbor models, naive Bayes, decision trees, linear regression models, support vector machines (SVM), neural networks, k-means clustering, Bayesian methods, statistical methods, bootstrap models, Q-learning models, temporal difference (TD) models, or deep adversarial networks.

The provision of data can include providing access to a biometric cryptographic key if the received data is successfully authenticated. In some variations, a prompt can be provided, in a graphical user interface presented to the user, soliciting the user to provide an alphanumeric password. Thereafter, via the graphical user interface, user-generated input can be received that includes an inputted password. The password can then be locally encrypted using the biometric cryptographic key. Further, the biometric cryptographic key can be used to decrypt a locally stored domain password.

The biometric cryptographic key can be programmatically generated based on one or more attributes of a computing device used to execute the desired biometric sequence.

The received data can include a vectorization of various action values forming part of the user-generated biometric sequence in a vector. The authenticating, in this case, includes individually determining, using that each part of the at least one machine learning model, that each action value forming part of the vector indicates that the user-generated biometric sequence was performed by a desired user. Further, for each successfully authenticated action value, a corresponding portion of the biometric cryptographic key can be provided, and the portions of the biometric cryptographic key can be concatenated to result in a final biometric cryptographic key.

The threshold, in some variations, can be static and pre-defined. Further, the threshold corresponds to a confidence level. Such confidence level can dynamically change.

The providing data characterizing the authenticating can include one or more of: causing such data to be displayed in an electronic visual display, loading such data into memory, storing such data in physical persistence, transmitting such data to a remote computing device.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for biometrically authenticating users which, in turn, reduces the likelihood of unauthorized users accessing software systems. Moreover, the current subject matter is advantageous in that it provides higher levels of security while, in some implementations, avoiding the need for using alphanumeric passwords which are often simplistic in nature and easier to defeat.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to systems, apparatus, methods, and computer-program products for password-less authentication techniques for access to software systems/computing resources. These techniques can be standalone or used in connection with other techniques such as conventional user name/password login prompts and the like. Further, these techniques utilize machine learning to more precisely characterize the actions of user as being genuine as opposed to a malicious actor trying to mimic the user's actions.

The authentication techniques herein can utilize a biometric sequence that involves a user taking a sequence of movements/actions using one or more input devices of a computing device (e.g., tablet, mobile phone, laptop, desktop, IoT device, etc.).

In particular, machine learning models are used to characterize and differentiate how a particular user handles input devices such as a touchscreen, a keyboard, a track pad, and/or a mouse during an authentication process. An authentication sequence as used herein can comprise a biometric sequence in which the input device is used to execute a sequence of actions. These actions can be movements (for example according to a grid or other pattern which requires numerous individual movements), an activation of a graphical user interface (GUI) element, activation of an input device element (e.g., clicking a button, moving a track pad or roller, etc.).

In some variations, in order for the machine learning models to be tailored to a particular user, these machine learning models must first be trained. The training period requires that the user repeat the biometric sequence numerous times. An authentication application can, for example, prompt the user to perform the sequence multiple times, perhaps throughout multiple days (deemed as the "training period") so the machine learning model(s) may continuously fine-tune itself. In some other variations, the training is continual (i.e., the models are adaptive, etc.) in that the models can be "fine-tuned" based on user actions for each subsequent execution of the biometric sequence.

In some variations, the biometric sequence can be analyzed using two factors. First, a determination can be made as to whether the user completed the biometric sequence. This determination does not necessarily require the use of a machine learning model. Second, a determination can be made as to whether the user behavior when completing the biometric sequence is likely to have been performed by the corresponding user. This second determination can use at least one machine learning model which is trained during the training period.

Figure 1:
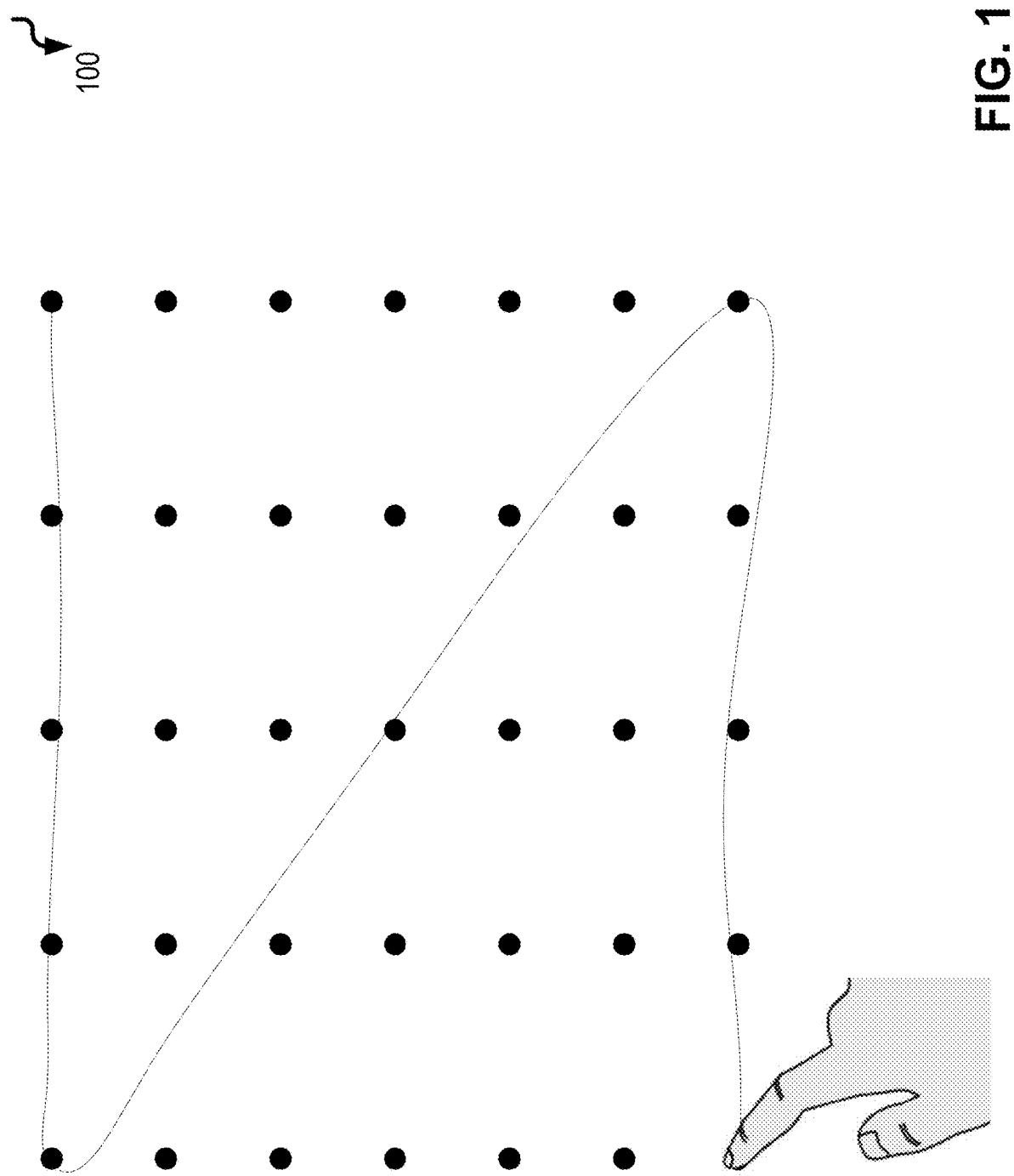
FIG. 1 is a diagram showing a user executing a pre-defined biometric sequence during a machine learning model training period.
Figure 2:
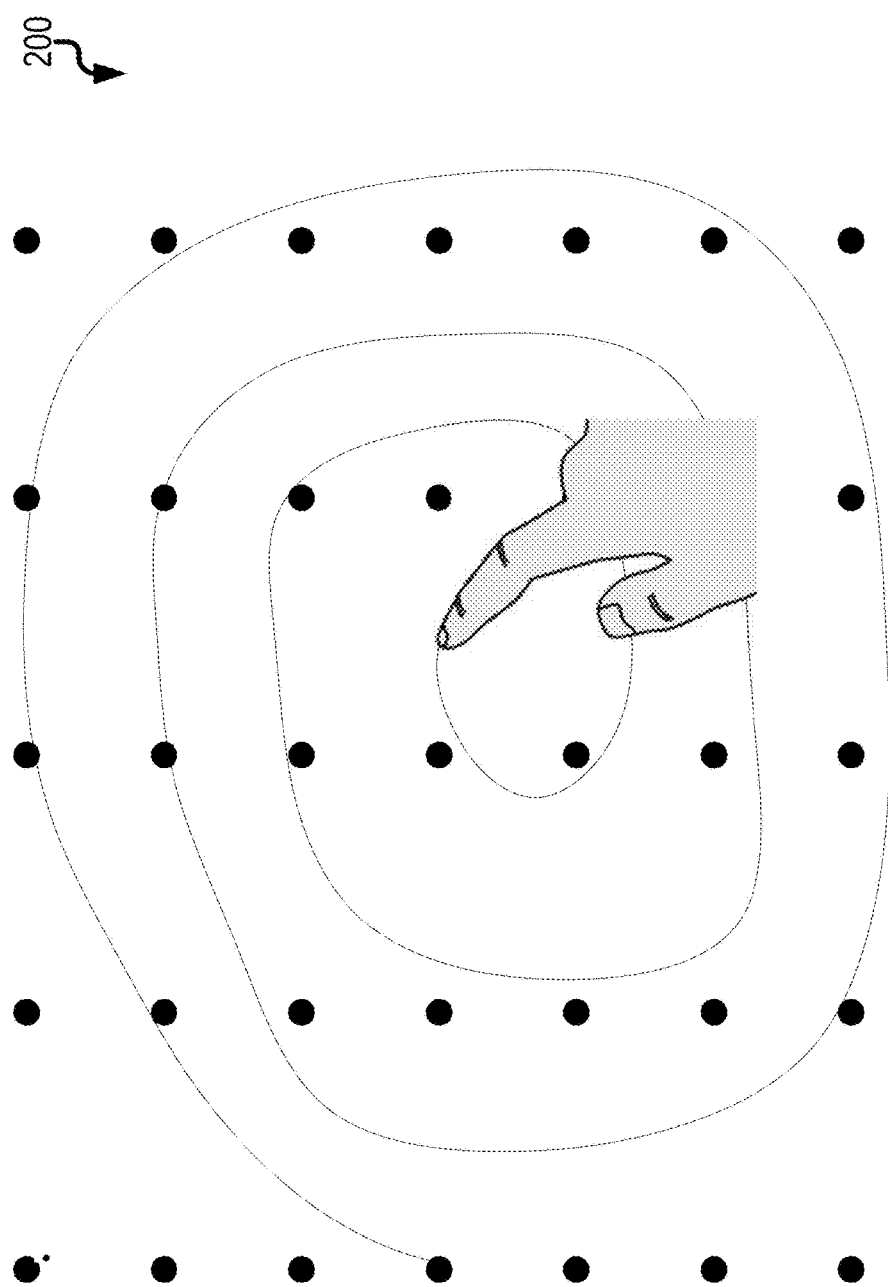
FIG. 2 is a diagram showing a user executing a unique biometric sequence during a machine learning model training period.

In some case, the biometric sequence is pre-defined so that the user repeats a known sequence numerous times and each of the actions forming part of the sequence are characterized. For example, with reference to diagram 100 of FIG. 1, a GUI of the computing device (e.g., mobile phone, etc.) may include a grid of points and the pre-defined biometric sequence requires the user to input a backwards "Z" across the points of the grid with the user activating an input device at each point of the "Z". In other cases, with reference to diagram 200 of FIG. 2, the biometric sequence is generated by the user during the training period. For example, the user may opt to create a spiral shape via an input device of the computing device and repeat such shape numerous times during the training period. Optionally, the user may also activate an input device at various points along the spiral (e.g., depress touch screen at beginning and end of spiral, etc.).

In another variation, the biometric sequence is not pre-defined but rather, is either generated on the fly or is randomly selected from a large number of available biometric sequences. In either event, a machine learning can be used to generate/modify the "rules" or the "types of sequences" that a user inputs, in order to maximize the ability of the models to recognize the particular user. The biometric sequence can be dynamically modifiable according to the machine learning algorithms to decrease the likelihood of third parties from successfully executing the biometric sequence (as determined by the machine learning models). Described differently, the machine learning models (with regard to biometric sequence generation) can constantly experiment with what actions/sequences comprise the biometric sequence.

Various attributes that characterize the biometric sequences are recorded during each execution of the biometric sequence during the training period. For example, with the example of FIG. 1, the speed at which each line forming part of the backwards "Z" is drawn, the amount of rest time at each end point of the backwards "Z", the X-Y coordinate deviations of each line, the pressure applied for each line and/or at each end point, and the like.

In one example, values for the attributes can populate a 20-dimensional vector that characterizes:

Time for left-click or drag-n-drop
Time for right-click
Time 1 for double-click
Time 2 for double-click
Time 3 for double-click
Direction of mouse movement or drag-n-drop
Line binned of mouse movement or drag-n-drop
Line velocity of mouse movement or drag-n-drop
Curve binned of mouse movement or drag-n-drop
Curve velocity of mouse movement or drag-n-drop
Curve acceleration of mouse movement or drag-n-drop
Ratio of curve to line of mouse movement or drag-n-drop
Offset of mouse movement or drag-n-drop
Error of mouse movement or drag-n-drop
Variability of mouse movement or drag-n-drop
Curvature of mouse movement or drag-n-drop
Curvature rate of mouse movement or drag-n-drop
Curvature velocity of mouse movement or drag-n-drop
Curvature acceleration of mouse movement or drag-n-drop
Angular velocity of mouse movement or drag-n-drop The various attributes in the vector can be used to generate a biometric cryptographic key that is unique to the user. This biometric cryptographic key can be generated by encrypting the vector using, for example, AES 256 algorithm or the like. In other variations, the biometric cryptographic key can be programmatically generated by the product based one or more computing device specific attributes, and the key then be associated to the vector.

In some variations, the biometric cryptographic key can be a concatenation of key portions that each correspond to one of the attributes in the vector. For example, the biometric cryptographic key can be stored as a portion of different key portions and each key portion is returned only if the conditions (as determined by the machine learning model) deem that the attribute values indicate that the correct user performed that portion of the biometric sequence.

During run-time (i.e., after the training period, etc.), the user is prompted or otherwise causes a biometric sequence to be entered via the interface of the computing device (either directly through a touch screen and attached buttons or via externa input device such as a mouse, keyboard, trackpad, roller ball, etc.). Initially, the biometric sequence is analyzed to ensure that it was completed properly (e.g., the input device made the proper motions, etc.). If this analysis indicates that the sequence was properly completed, the user-generated biometric sequence is input (either directly or after being vectorized based on pre-defined attributes) into at least one machine learning model that is trained using, at least, the biometric sequences generated during the training period.

In some cases, the at least one machine learning model can also be trained using data generated from other users (e.g., data that characterizes other users' behavior when performing the same or similar biometric sequence).

The output of the at least one machine learning model can, for example, be a score (e.g., a confidence score, etc.) that characterizes the likelihood of the user having generated the biometric sequence input via the computing device (directly or via peripherals). In some cases, a score threshold can be utilized (which may vary user-to-user or which may adaptively change based on user behavior) which, when exceeded, indicates that the inputted biometric sequence was performed by the user. When the scores indicate that the actions were that of the desired user, some or all of the biometric cryptographic key can be made available. In some cases, each attribute of the biometric sequence can have a different key portion which is returned upon the successful determination that such attribute indicates that the corresponding user behavior is that of the user.

Various type of machine learning models can be used including, supervised learning, unsupervised learning, semi-supervised learning, and/or reinforcement learning based models. Further, as noted above, multiple machine learning models may be used either, in parallel, or in a cascading arrangement in which outputs of models are used as inputs (or partial inputs) to other models. Supervised learning models that can be used include: random forests, nearest neighbor models, naive Bayes, decision trees, linear regression models, support vector machines (SVM), and/or neural networks. Unsupervised learning models that can be used include k-means clustering. Bayesian methods (including semi- and non-parametric methods), statistical methods such as bootstrap, and the like. Semi-supervised learning can incorporate elements from both supervised learning and unsupervised learning models. Reinforcement learning models can include Q-learning models, temporal difference (TD) models, deep adversarial networks, and the like.

There are different types of authentication workflows that can be used in connection with the password-less techniques described herein.

Figure 3:
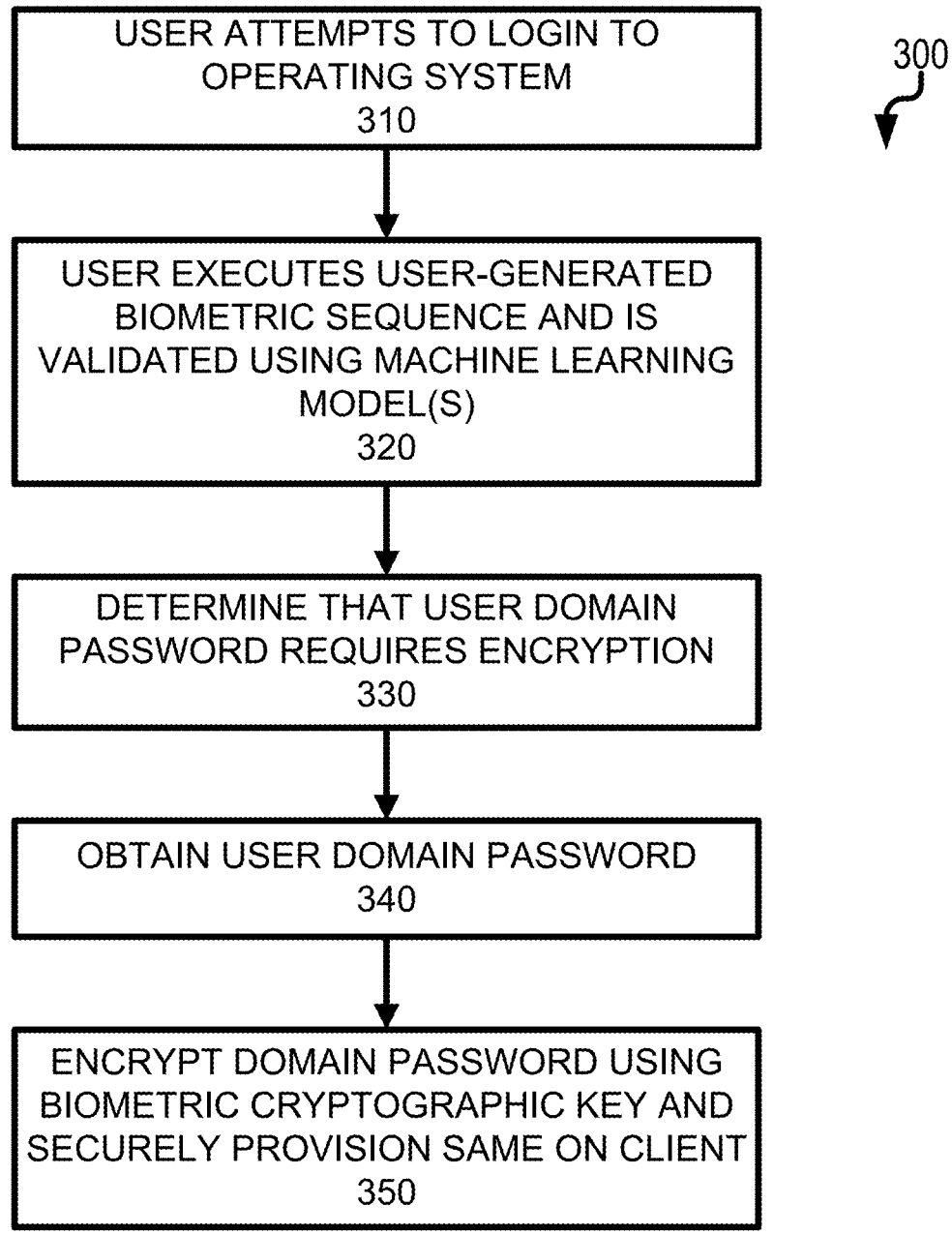
FIG. 3 is a process flow diagram illustrating a first authentication workflow.

In one workflow, an agent can be used to generate a biometric cryptographic key based on a biometric sequence and obtain a domain password to create a stored encrypted passphrase (based on the combination of the generated biometric cryptographic key generated during a training period and the user-provided domain password) that can be used for subsequent authentication once the user enters the same or similar (within pre-defined scoring thresholds, etc.) biometric sequence. With reference to process flow diagram 300 of FIG. 3, initially, at 310, a user attempts to login into an operating system (e.g., WINDOWS, etc.) of a client device and is presented with a login screen in a graphical user interface. Thereafter, at 320, the user, via the graphical user interface and input device(s), goes through the authentication workflow by performing the biometric sequence specified during the training period. This biometric sequence can be validated (i.e., it can be confirmed that the biometric sequence was properly executed), and additionally, other user behavior attribute data can be (which characterizes how the properly executed biometric sequence was performed). Upon successful authentication, at 330, it can be determined that the user requires a real-time (inline) encryption of the user's current domain password. Next, at 340, an additional screen can be presented in the graphical user interface prompting user to enter the domain password, and then, optionally, a second time to confirm the domain password. After successful conformation of the domain password, at 350, the domain password is then provisioned securely on the client device, based on determination of available security container(s) for subsequent reuse. For example, the encrypted password value corresponding to the domain password can be stored locally in a secure container such as a Trusted Platform Module (TPM), or alternative, the encrypted password value can be stored in the HKLM registry if TPM is not available.

Figure 4:
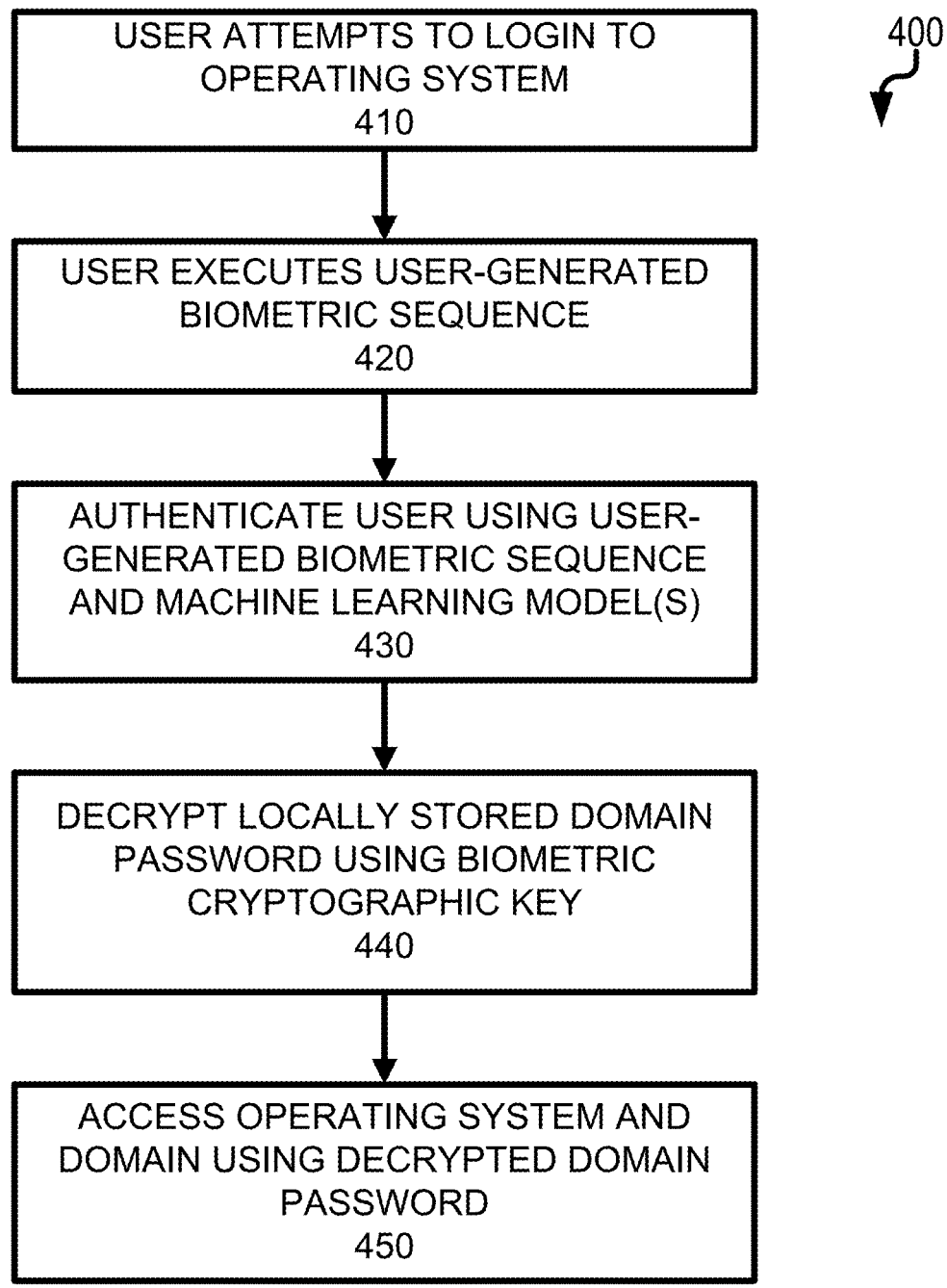
FIG. 4 is a process flow diagram illustrating a second authentication workflow.

Another authentication workflow relates to subsequent logons in which an encrypted passphrase is decrypted with a real-time collected biometric cryptographic key (derived from the user-generated biometric sequence in the computing device). With reference to process flow diagram 400 of FIG. 4, initially, at 410, a user attempts to login to the operating system (e.g., WINDOWS, etc.) and domain of a client device. Thereafter, the user is presented, via a graphical user interface, a login screen with an authentication workflow that prompts the user to input a biometric sequence. Next, at 420, user-generated input is received and it is determined that the user properly executed the pre-determined biometric sequence forming part of the authentication workflow. Thereafter, it can be determined, at 430, whether the user behavior when properly executing the biometric sequence indicates that the biometric sequence was executed by the required user. For example, based on a pre-defined set of features that can identify one user behavior from another (e.g., the vectorized attributes, etc.), a confidence score can be generated, by at least one model, for each feature. When the confidence score is above an accepted threshold (which can be fixed or vary), a portion of a biometric cryptographic key is returned. This iterative process can be repeated until each and every input/action has been scored which results in all returned key portions being concatenated to become a final biometric cryptographic key. Subsequently, at 440, the locally stored encrypted value can be decrypted (using, for example, the AES 256 algorithm, etc.) using final biometric cryptographic key resulting in the domain password. Later, at 450, an operating systems credential provider can use the decrypted domain password to log the user into the operating system and to the domain.

Figure 5:
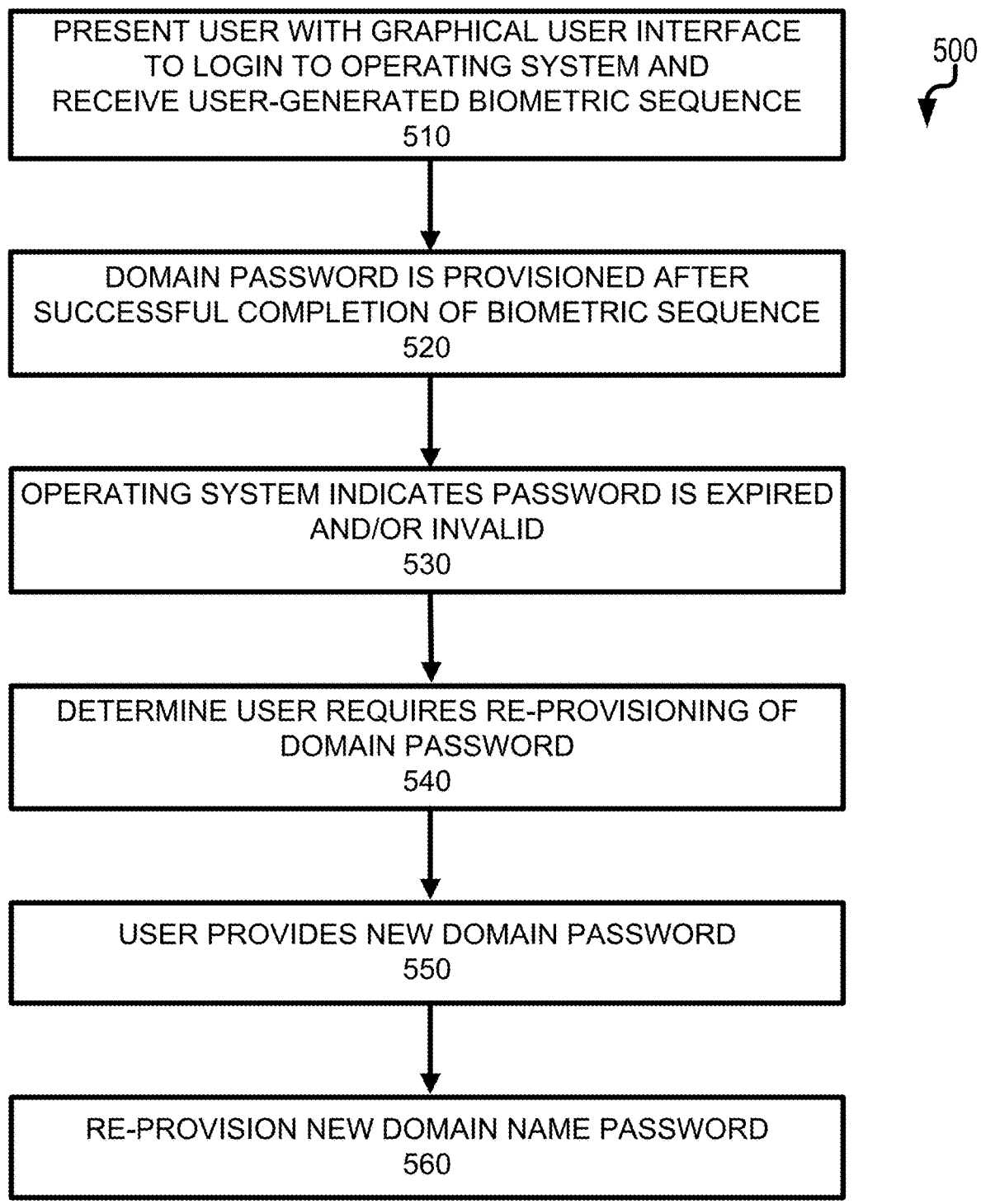
FIG. 5 is a process flow diagram illustrating a third authentication workflow.

Another authentication workflow relates to scenarios in which a password has expired and/or an invalid password has been repeatedly been entered (causing the system to lock out the user). With reference to diagram 500 of FIG. 5, at 510, a user is presented with a graphical user interface allowing him or her to attempt to login to an operating system and a domain. Thereafter, the user executes a biometric sequence as described above. Next, at 520, upon successful completion of the biometric sequence (both sequence and user behavior-wise), the provisioned domain password is extracted. The operating system then, at 530, indicates that the password is expired or otherwise invalid. It is then determined, at 540, that the user requires inline re-provisioning of the domain password. Next, at 550, an additional screen is shown in the graphical user interface that prompts the user to enter the domain password, and, optionally, then a second time to confirm the domain password.

The domain password is then, at 560, re-provisioned securely, based on determination of available security container(s). This re-provisioning can include generating, using at least one model, a confidence score for each feature based on a pre-defined set of features (i.e., vectorized attributes, etc.) that can identify one user behavior from another. When the confidence score is above the accepted threshold, a portion of a biometric cryptographic key is returned. This process can be repeated until each and every input has been scored and all returned key portions will be concatenated to become the final biometric cryptographic key. The domain password is then encrypted using, for example, the AES 256 algorithm, with the biometric cryptographic key. The encrypted password value can then be stored locally in a secure container, like a Trusted Platform Module (TPM), if available. Alternatively, the encrypted password value can be stored in the HKLM registry if TPM is not available The operating system credential provider can use the supplied domain password to log the user into the operating system and to the domain.

Figure 6:
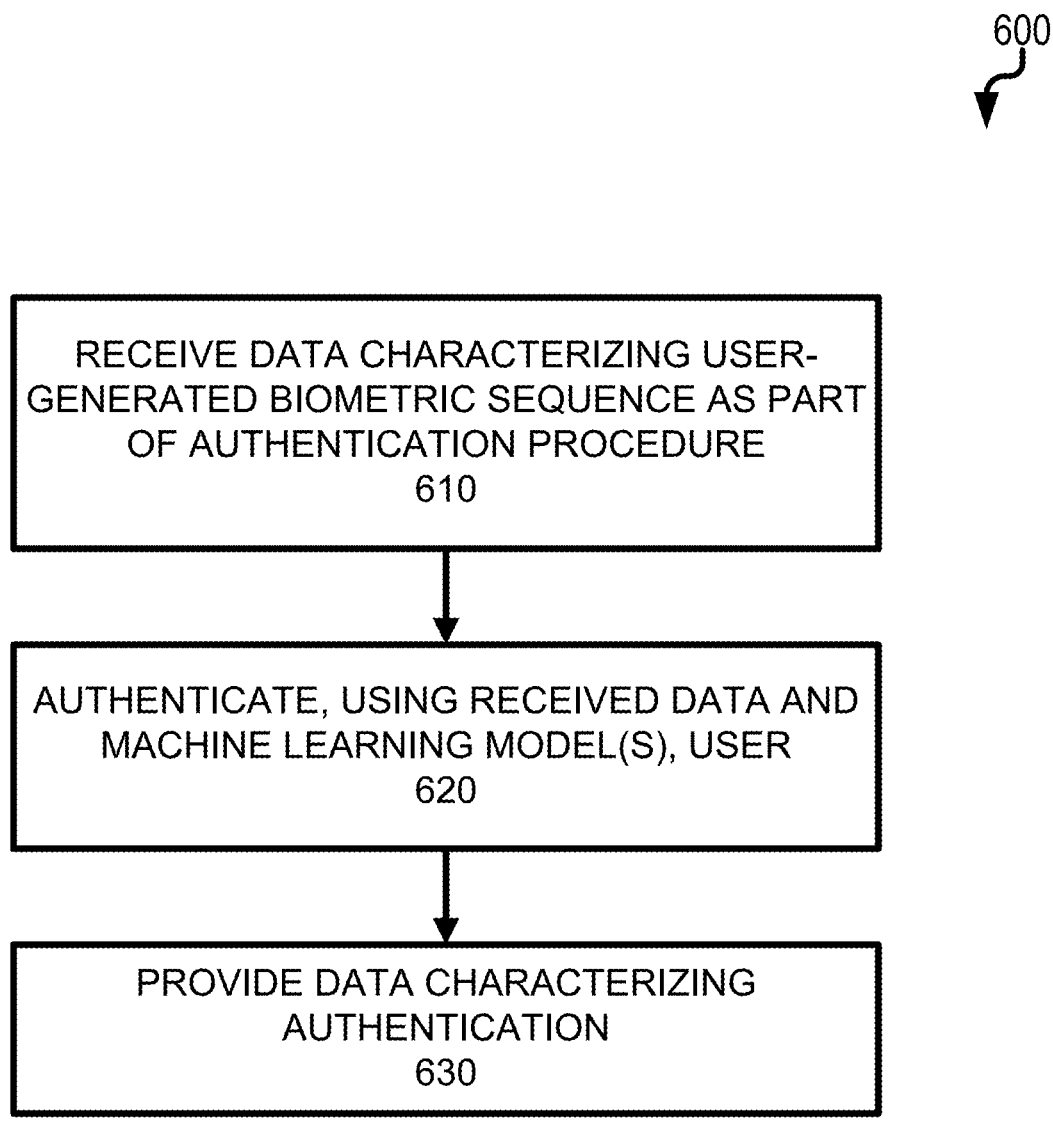
FIG. 6 is a process flow diagram illustrating authentication of a user executing a biometric sequence.

FIG. 6 is a process flow diagram in which, at 610, data is received, as part of an authentication procedure to identify a user, that characterizes a user-generated biometric sequence. The user-generated biometric sequence is generated by the user interacting with at least one input device according to a desired biometric sequence. Thereafter, at 620, the user is authenticated, using the received data and at least one machine learning model trained using empirically derived historical data generated by a plurality of user-generated biometric sequences (e.g., user-generated biometric sequences according to the desired biometric sequence), if an output of the at least one machine learning model is above a threshold. In some cases, the threshold is pre-defined (for example based on confidence level). In other cases, the threshold may be based on another mapping from the output of the at least one machine learning model to confidence level, and such mapping can change dynamically. Subsequently, at 630, data is provided (e.g., loaded into memory, stored, displayed, transmitted, etc.) that characterizes the authenticating.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 7:
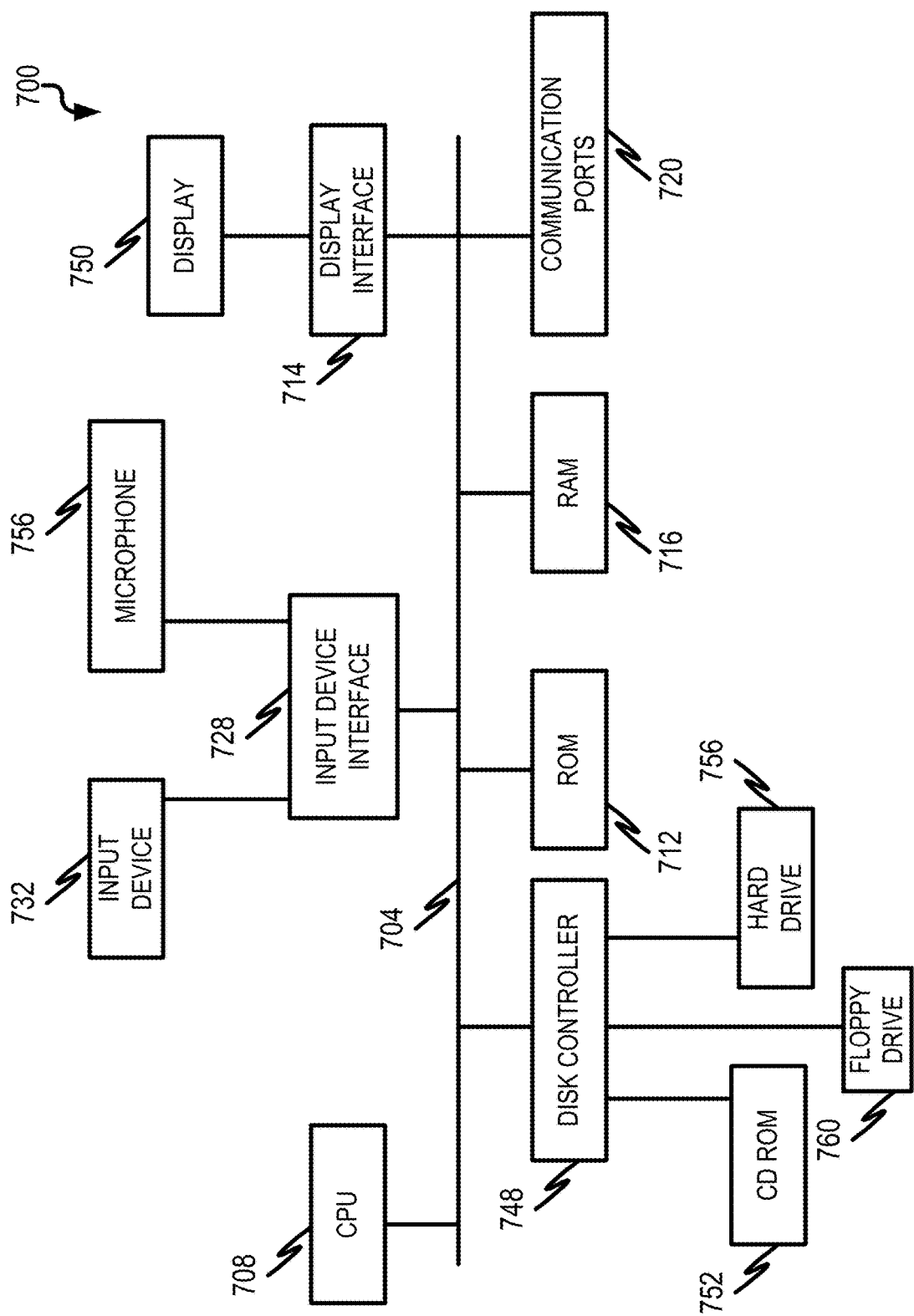
FIG. 7 is a diagram illustrating a computing device for implementing aspects described herein.

FIG. 7 is a diagram illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface one or more optional disk drives to the system bus 704. These disk drives can be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 to the user and an input device 732 such as keyboard and/or a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. In the input device 732 and the microphone 736 can be coupled to and convey information via the bus 704 by way of an input device interface 728. Other computing devices, such as dedicated servers, can omit one or more of the display 740 and display interface 724, the input device 732, the microphone 736, and input device interface 728.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, as part of an authentication procedure to identify a user, data characterizing a user-generated biometric sequence, the user-generated biometric sequence being generated by the user interacting with at least one input device according to a desired biometric sequence, wherein the received data comprises a vectorization of various action values forming part of the user-generated biometric sequence in a vector;
   authenticating, using the received data and at least one machine learning model trained using empirically derived historical data generated by a plurality of user-generated biometric sequences, the user;
   the authenticating comprising:
      individually determining, using the at least one machine learning model, that each action value forming part of the vector indicates that the user-generated biometric sequence was performed by a desired user by determining that a confidence level associated with each action value is above a corresponding threshold;
      providing, for each successfully authenticated action value forming part of the vector, a corresponding portion of a biometric cryptographic key; and
      concatenating the provided portions of the biometric cryptographic key to result in a final biometric cryptographic key; and
   providing data characterizing the authenticating,
   wherein the confidence level for each action value adaptively changes based on behavior of the user.

2. The method of claim 1, wherein the desired biometric sequence is pre-defined.

3. The method of claim 1, wherein the desired biometric sequence is dynamically generated using at least one biometric sequence generation machine learning model.

4. The method of claim 1 further comprising:
   receiving, as part of a training process prior to the authentication procedure, training data forming at least a part of the empirically derived historical data.

5. The method of claim 1 wherein the authenticating further comprises: initially determining whether the user correctly completed the desired biometric sequence.

6. The method of claim 1, wherein the at least one machine learning model comprises a model utilizing at least one of: supervised learning, unsupervised learning, semi-supervised learning, or reinforcement learning.

7. The method of claim 1, wherein the at least one machine learning model comprises one or more of: random forests, nearest neighbor models, naive Bayes, decision trees, linear regression models, support vector machines (SVM), neural networks, k-means clustering, Bayesian methods, statistical methods, bootstrap models, Q-learning models, temporal difference (TD) models, or deep adversarial networks.

8. The method of claim 1, wherein the providing data comprises: providing access to the final biometric cryptographic key if the received data is successfully authenticated.

9. The method of claim 8 further comprising:
providing, in a graphical user interface presented to the user, a prompt to provide an alphanumeric password;
receiving, via the graphical user interface, user-generated input comprising an inputted alphanumeric password; and
locally encrypting the inputted alphanumeric password using the final biometric cryptographic key.

10. The method of claim 8 further comprising:
decrypting a locally stored domain password using the final biometric cryptographic key.

11. The method of claim 8, wherein the final biometric cryptographic key is programmatically generated based on one or more attributes of a computing device used to execute the desired biometric sequence.

12. The method of claim 1, wherein the providing data characterizing the authenticating comprises at least one of: causing the data characterizing the authenticating to be displayed in an electronic visual display, loading the data characterizing the authenticating into memory, storing the data characterizing the authenticating in physical persistence, transmitting the data characterizing the authenticating to a remote computing device.

13. A system comprising:
at least one data processor; and
memory storing instructions which, when executed by the at least one data processor, result in operations comprising:
receiving, as part of an authentication procedure to identify a user, data characterizing a user-generated biometric sequence, the user-generated biometric sequence being generated by the user interacting with at least one input device according to a desired biometric sequence, wherein the received data comprises a vectorization of various action values forming part of the user-generated biometric sequence in a vector;
authenticating, using the received data and at least one machine learning model trained using empirically derived historical data generated by a plurality of user-generated biometric sequences, the user;
the authenticating comprising:
individually determining, using the at least one machine learning model, that each action value forming part of the vector indicates that the user-generated biometric sequence was performed by a desired user by determining that a confidence level associated with each action value is above a corresponding threshold;
providing, for each successfully authenticated action value forming part of the vector, a corresponding portion of a biometric cryptographic key; and
concatenating the provided portions of the biometric cryptographic key to result in a final biometric cryptographic key; and
providing data characterizing the authenticating;
wherein the confidence level for each action value adaptively changes based on behavior of the user.

14. The system of claim 13, wherein the desired biometric sequence is dynamically generated using at least one biometric sequence generation machine learning model.

15. The system of claim 13, wherein the operations further comprise:
receiving, as part of a training process prior to the authentication procedure, training data forming at least a part of the empirically derived historical data.

16. The system of claim 13, wherein the authenticating further comprises: initially determining whether the user correctly completed the desired biometric sequence.

17. The system of claim 13, wherein the at least one machine learning model comprises one or more of: random forests, nearest neighbor models, naive Bayes, decision trees, linear regression models, support vector machines (SVM), neural networks, k-means clustering, Bayesian methods, statistical methods, bootstrap models, Q-learning models, temporal difference (TD) models, or deep adversarial networks.

18. The system of claim 13, wherein the providing data comprises: providing access to the final biometric cryptographic key if the received data is successfully authenticated.

19. The system of claim 18, wherein the operations further comprise:
providing, in a graphical user interface presented to the user, a prompt to provide an alphanumeric password;
receiving, via the graphical user interface, user-generated input comprising an inputted alphanumeric password; and
locally encrypting the inputted alphanumeric password using the final biometric cryptographic key.

20. The system of claim 18, wherein the operations further comprise: decrypting a locally stored domain password using the final biometric cryptographic key.

* * * * *